(12) United States Patent
DeFranks

(10) Patent No.: US 9,657,800 B2
(45) Date of Patent: May 23, 2017

(54) SYSTEMS AND METHODS FOR CUSHION SUPPORTS

(71) Applicant: DREAMWELL, LTD., Las Vegas, NV (US)

(72) Inventor: Michael S. DeFranks, Decatur, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 92 days.

(21) Appl. No.: 14/456,423

(22) Filed: Aug. 11, 2014

(65) Prior Publication Data

US 2014/0346718 A1    Nov. 27, 2014

Related U.S. Application Data

(63) Continuation of application No. 12/852,143, filed on Aug. 6, 2010, now Pat. No. 8,800,979.

(60) Provisional application No. 61/231,911, filed on Aug. 6, 2009.

(51) Int. Cl.
| | |
|---|---|
| *F16F 3/00* | (2006.01) |
| *F16F 3/02* | (2006.01) |
| *A47C 23/00* | (2006.01) |
| *A47C 27/06* | (2006.01) |

(52) U.S. Cl.
CPC ............ *F16F 3/023* (2013.01); *A47C 23/002* (2013.01); *A47C 27/065* (2013.01); *F16F 3/02* (2013.01); *Y10T 29/49613* (2015.01)

(58) Field of Classification Search
CPC ....... A47C 23/002; A47C 23/02; A47C 23/04; A47C 23/0433; A47C 23/0436; A47C 23/0438; A47C 27/065; B23P 19/048; F16F 3/023; F16F 3/02; Y10T 29/49613

USPC ... 267/103, 80, 81, 83, 86, 93, 94, 107, 110, 267/142, 144; 5/247, 255; 297/452.49, 297/452.53, 452.55

See application file for complete search history.

(56) References Cited

U.S. PATENT DOCUMENTS

| | | |
|---|---|---|
| 88,070 A | 3/1869 | Partello |
| 147,247 A | 2/1874 | Drake |
| 1,630,459 A | 5/1927 | Zeilder |

(Continued)

FOREIGN PATENT DOCUMENTS

| | | |
|---|---|---|
| CN | 2688970 Y | 3/2005 |
| CN | 2708766 Y | 7/2005 |

(Continued)

OTHER PUBLICATIONS

Office Action and English Translation of Office Action issued in Chinese Patent Application No. 201080034568.5, dated May 16, 2014; 12 pages total.

(Continued)

*Primary Examiner* — Pamela Rodriguez
(74) *Attorney, Agent, or Firm* — Cantor Colburn LLP

(57) ABSTRACT

The mattress assemblies have an array of springs extending from a sheet. Each spring in the array may be manufactured by choosing a position for the spring, cutting a profile of the sheet spring in the sheet, peeling back or bending the profile or tab of the sheet, and shaping the profile to form the sheet spring. The array of springs may be formed from creating a plurality of such springs along rows and columns. In certain embodiments, multiple sheets may be stacked to form the sheet spring array.

13 Claims, 14 Drawing Sheets

(56) References Cited

U.S. PATENT DOCUMENTS

| | | |
|---|---|---|
| 2,277,853 A | 3/1942 | Kohn |
| 2,312,171 A | 2/1943 | Jochum |
| 2,439,530 A | 6/1944 | Tea |
| 2,433,012 A | 12/1947 | Zalicovitz |
| 3,506,295 A | 4/1970 | Yancey |
| 3,633,228 A | 1/1972 | Zysman |
| 3,765,038 A | 10/1973 | Curtis |
| 3,879,025 A | 4/1975 | Dillard |
| 3,974,532 A | 8/1976 | Ecchuya |
| 4,154,786 A | 5/1979 | Plasse |
| 4,713,854 A | 12/1987 | Graebe |
| 4,935,977 A | 6/1990 | Yamada |
| 5,409,200 A | 4/1995 | Zingher et al. |
| 5,632,473 A | 5/1997 | Dias Magalhaes Queiroz |
| 5,747,140 A | 5/1998 | Heerklotz |
| 5,749,133 A * | 5/1998 | Mauldin ............... B23P 19/048 29/430 |
| 5,785,303 A | 7/1998 | Kutschi |
| 6,113,082 A | 9/2000 | Fujino |
| 6,170,808 B1 | 1/2001 | Kutschi |
| 8,800,979 B2 * | 8/2014 | DeFranks ............ A47C 23/002 267/103 |
| 2004/0010854 A1 | 1/2004 | Oakhill et al. |
| 2010/0021685 A1 | 1/2010 | Brill et al. |
| 2014/0346718 A1 | 11/2014 | Defranks |

FOREIGN PATENT DOCUMENTS

| | | |
|---|---|---|
| CN | 2732084 Y | 10/2005 |
| CN | 2798733 Y | 7/2006 |
| CN | 201119628 Y | 9/2008 |
| GB | 2055173 A | 2/1981 |
| WO | 03075716 A2 | 9/2003 |
| WO | 2011017640 A1 | 2/2011 |

OTHER PUBLICATIONS

Office Action and English Translation of Office Action, issued Chinese Patent Application No. 201080034568.5, dated Dec. 11, 2013; 19 pages total.

Notification Concerning the Trasmittal of the International Preliminary Report on Patentability issued in International Application No. PCT/US2010/044752 filed Aug. 6, 2010; 6 pages.

Office Action issued in Canadian Patent Application No. 2,770,105, dated Aug. 1, 2016; 4 pages.

* cited by examiner

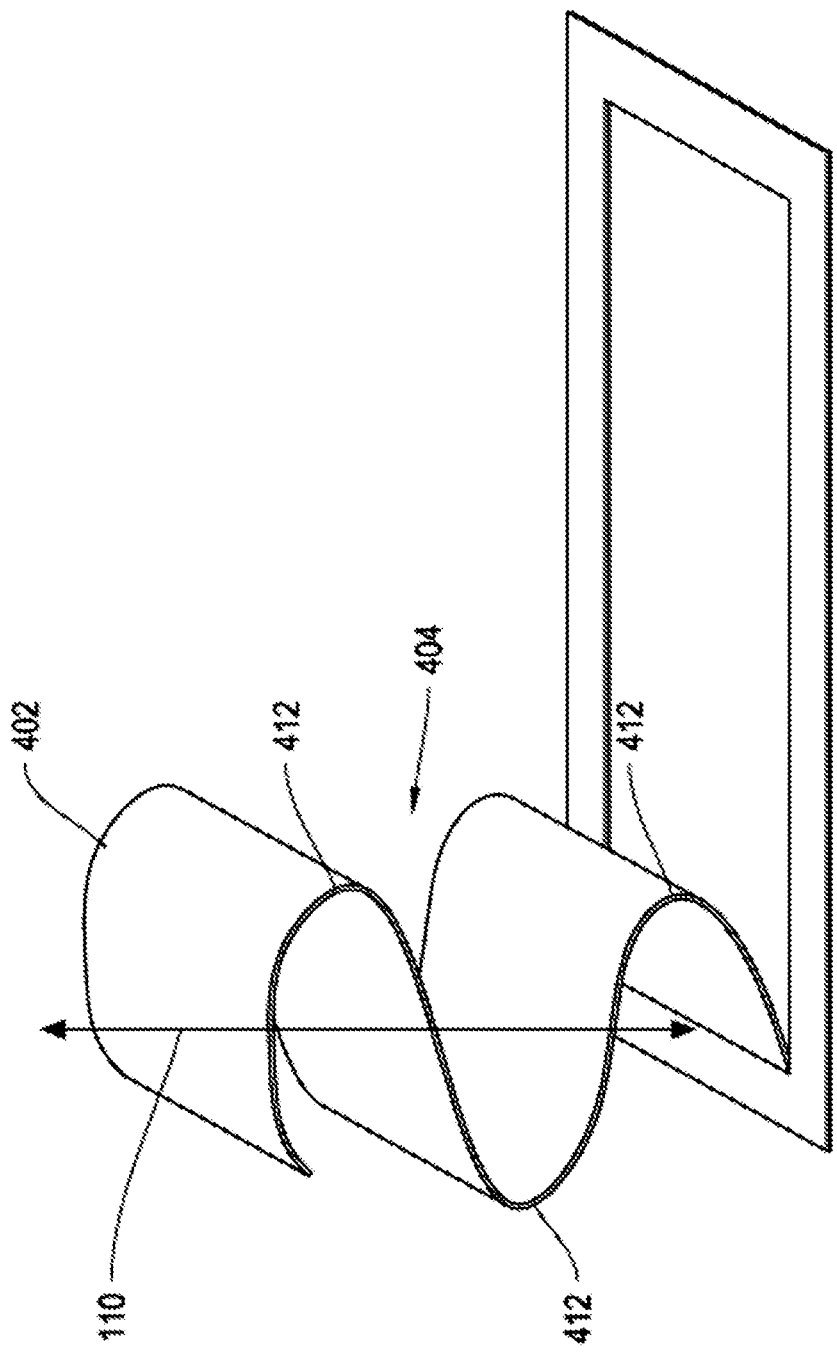

SYSTEMS AND METHODS FOR CUSHION SUPPORTS

CROSS REFERENCE TO RELATED APPLICATIONS

This application is a CONTINUATION of U.S. application Ser. No. 12/852,143, filed Aug. 6, 2010, which claims the benefit of U.S. Provisional Application No. 61/231,911, filed Aug. 6, 2009, both of which are incorporated by reference in their entirety.

BACKGROUND

Generally, cushioning articles such as mattresses have an innercore formed from an array of helically shaped spring coils to provide mattress resiliency. Typically each spring coil is individually made of steel wire and then attached to other springs to form a matrix of rows and columns of springs in the size and shape desired. These types of spring assemblies may be used in mattresses, sofas, box springs, car seats and other types of furniture.

An alternative inner spring core uses leaf springs arranged in a matrix of rows. One example of a leaf spring innercore is described in U.S. Pat. No. 4,935,977 which shows a leaf spring assembly comprised of upwardly curved flat bar leaf springs designed to flex at various loads. The depicted leaf springs extend across the width of the mattress with attachment points at either side that hold the spring under tension. A sleeping user causes a downward force that compresses the leaf springs, causing them to flex downwardly and deform, increasing the tension in the spring. An additional leaf spring design is depicted in U.S. Pat. No. 6,170,808, which shows a sparse matrix of leaf springs cut from a metal plate and arranged into a mattress core. Each leaf spring is upwardly curved and covered with a foam support pad to thereby support a portion of the load of a sleeping user. Each spring is fixed at a center location. A downward force causes the spring to deform, compressing the spring downwardly. A transverse force may cause the spring to tilt about its point of attachment, deforming under the lever action of the cantilevered spring.

As noted in the above publications, the mechanical dynamics by which leaf springs carry a load has both similarities and differences with how coil springs carry a load, particularly a moving load, such as a person moving across a surface suspended by the spring elements. The dynamic response of a leaf spring has similarities and differences from that of a coil spring, and modeling those differences is challenging. As noted in "Automotive Math Handbook", Forbes Air MBI Publishing Company (2000) pg. 81, the calculation of the rate of mono-leaf spring is challenging and any equation or model of rate is at best an approximation, requiring it be checked against empirical analysis. The response is further complicated by the restraining effect of lacing wires, border wires and fabric, all of which effect dynamics. As such, there remains a need in the art for a leaf spring assembly that provides improved load mechanics, including improved load carrying mechanics for a moving load or loads.

SUMMARY

The systems and methods described herein are directed to mattress assemblies having an array of springs extending from a rigid sheet. Each spring in the array may be manufactured by choosing a position for the spring in a rigid sheet, cutting a profile of the sheet spring in the rigid sheet, peeling back or bending the profile or tab of the sheet, and shaping the profile to form the sheet spring. The array of springs may be formed from creating a plurality of such springs along rows and columns. In certain embodiments, a plurality of rigid sheet members having staggered arrays of springs may be stacked on top of each other to form a more dense array of springs for the cushioning article. For purposes of clarity, and not by way of limitation, the systems and methods may be described herein in the context of mattress assemblies. However, it may be understood that the systems and methods described herein may be applied to provide for any type of cushioning article. For example, the systems and methods of the invention may be used for seat cushions, pillows, and other such cushioning articles.

More particularly, the mattress assembly with metal springs described herein include a mattress core with at least one metallic rigid sheet. Springs may be formed from sections of the sheet that are partially punched out and bent. The spring characteristics of the springs may depend on their shape, size, and material. In some embodiments, multiple rigid and resilient sheet members containing springs may be stacked to form a sheet spring array. The springs of a first sheet may be aligned with the springs of a second sheet such that the springs of the second sheet fit into openings adjacent to springs of the first sheet. The springs of the first and second sheet members may be in contact or spaced apart. In certain embodiments, three or more sheet members may be assembled in this fashion. In some embodiments, the springs may be formed in a reverse J-shape. In certain embodiments, the springs may be formed in an S-shape or a serpentine shape.

In one embodiment, a sheet spring innercore for a mattress assembly is disclosed, wherein an innercore with a first and a second metallic sheet and sheet springs formed in the first and second metallic sheet members is provided. The sheet springs of the first and second metallic sheet members are aligned such that the springs of the second sheet fit into openings adjacent to springs of the first sheet. The first and second metallic sheet members are stacked to fit the springs of second metallic sheet into the openings adjacent to the springs of the first sheet.

Additional features and advantages are realized through the techniques of the present disclosure. Other embodiments and aspects of the disclosure are described in detail herein and are considered a part of the claimed disclosure. For a better understanding of the disclosure with advantages and features, refer to the description and to the drawings.

BRIEF DESCRIPTION OF THE SEVERAL VIEWS OF THE DRAWINGS

The foregoing and other objects and advantages of the invention will be appreciated more fully from the following further description thereof, with reference to the accompanying drawings wherein;

FIGS. 4A-4C depict other embodiments of a side fixed flat spring integrally formed to a base plate;

DETAILED DESCRIPTION

To provide an overall understanding of the invention, certain illustrative embodiments will now be described, including an innercore with non-coil springs that may be used with furniture. However, it will be understood by one of ordinary skill in the art that the systems and methods described herein may be adapted and modified for other suitable applications and that such other additions and modifications will not depart from the scope thereof. For example, the systems and methods described herein include, among other things, innercore spring assemblies that may be used as suspension supports for furniture, including mattresses, sofas, foundations or box springs and other applications. In one embodiment, the systems described herein include side-fixed flat springs that are shaped to have a curved surface that extends along an axis that is perpendicular to a metal base plate to which the flat spring is fixed at one side. In certain particular embodiments, the spring has a curved serpentine shape that curves away from and then back toward the starting point of the shape. The innercore spring assembly may be formed of one such array of springs or by multiple arrays that are stacked together, such that flat springs from plural assemblies combine to form one innercore assembly. Though not to be limited by theory, it is understood that the innercore assemblies provide flat springs that yield individually and collectively to a dynamic load in a manner comparable to an open coil innercore and that a downwardly applied load causes the flat spring to compress substantially along the longitudinal axis of the spring. Additionally disclosed herein are manufacturing methods for, among other things, manufacturing a spring assembly of flat springs by punching and bending a metal sheet, such as by processing through a progressive die, to produce an array of flat spring coils.

Figure 1A:
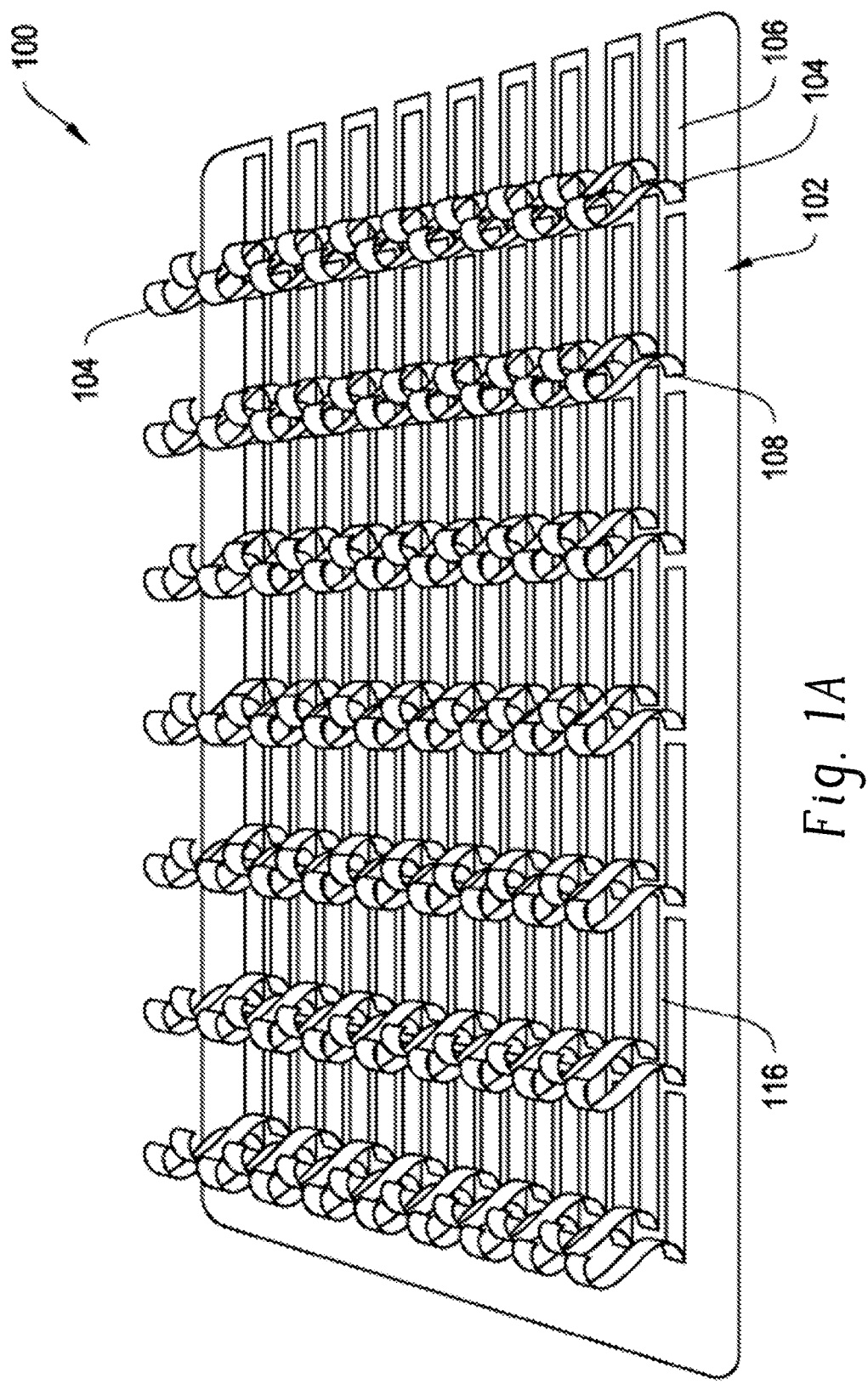
FIG. 1A depicts an angled side view of one sheet of a sheet spring system according to an illustrative embodiment of the invention.
Figure 1B:
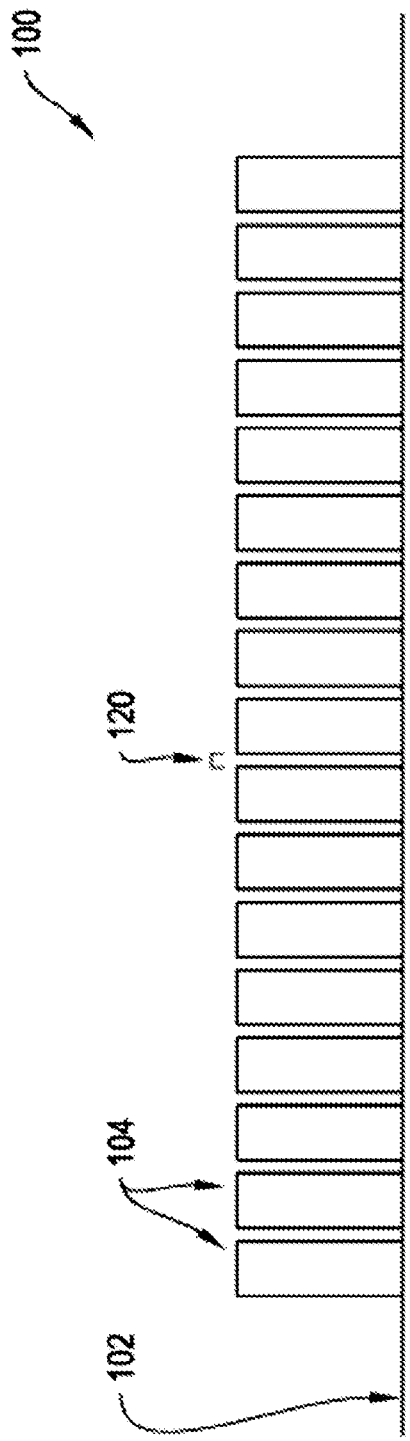
FIGS. 1B and 1C depict a first side view and a second side view of the sheet of FIG. 1A.
Figure 1C:
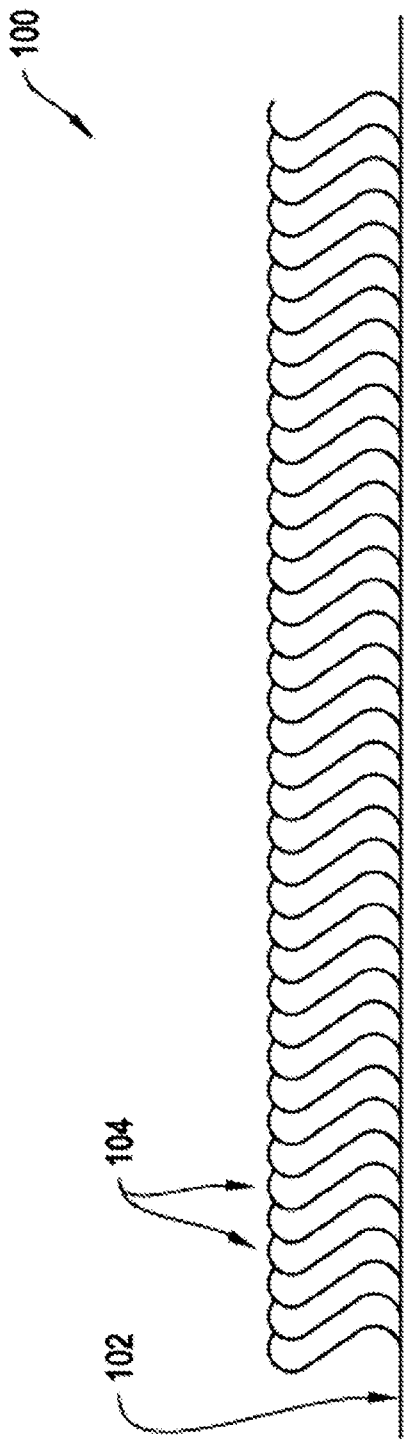
Figure 2:
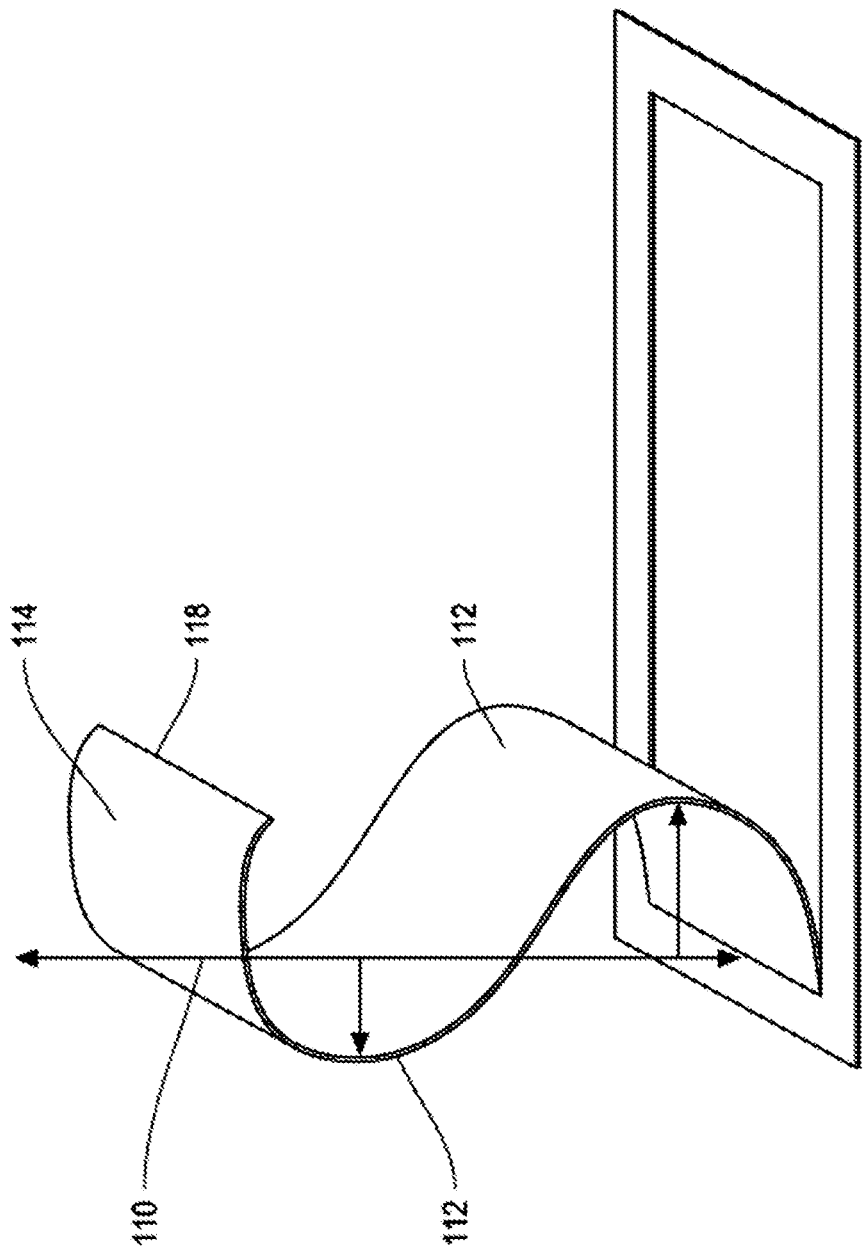
FIG. 2 depicts one embodiment of a side fixed flat spring integrally formed to a base plate.

FIGS. 1A-1C depict views of one illustrative embodiment of a spring array 100 containing a plurality of springs 104 suitable for use as a furniture innercore, such as a mattress innercore. In this depicted embodiment, the rows and/or columns of springs 104 are staggered from adjacent rows and/or columns. Specifically, FIG. 1A depicts a matrix of flat spring elements 104, a base 102, and a series of cutouts or openings 106. Each spring 104 attaches to the base 102 at an attachment point 108. FIG. 2 depicts a close-up view of one spring 104. The spring 104 is a flat band of material that has been given a serpentine shape, in the depicted spring it is an "S-shape", and the spring 104 extends upward from the base 102 along an axis 110 that is generally perpendicular to the plane of the base 102. As shown in FIG. 2, the attachment point 108 is generally centrally located within a bird's eye profile of the spring 104. The outermost regions 112 of the curves in spring 104 extend equal, but opposite distances from the center of the spring, and the center of the spring 104 is located over the attachment point 108. The apex 114 of spring 104 is substantially centered over the attachment point 108. Further, as shown in FIG. 1C, the apexes 114 of the multiple springs 104 are, in the depicted embodiment, of equal height and therefore fall substantially within a plane that is parallel to the plane of the plate 102, thereby providing an even support surface. In the depicted spring 104, the top most edge 118 is bent downward and away from any fabric covering that may be fit over the springs. The spring 104 is typically made from metal, and in particular steel, of a gauge and tensile strength suitable for durable use as a furniture spring. Most typically, the sheet spring will be made from spring steel and may be from SAE 5160. SAE 5160 is a carbon-chromium spring steel and has sufficient toughness and ductility with a tensile yield ratio that is effective for a sheet spring. Other suitable materials will include stainless steel and titanium alloys. Other materials will include phosphor bronze and beryllium copper, materials that are also suitably conductive to allow one or more of the springs to conduct an electric signal if necessary. As noted above, in some embodiments the sheet 102 and spring 104 is made, in part or whole, from a suitable polymer such as but not being limited to ULTEM PEI (polyetherimide). Other polymers may be used as the material from which the sheet 102 and spring 104 is made, and polymer materials may be used to coat the sheet 102 and/or springs 104. The gauge employed will vary according to the application and any suitable gauge may be employed. In one embodiment, provided only as one non-limiting example, a gauge of 22 (0.0299") to 15 (0.0673") is employed. It will be noted that gauge designations vary for varieties of sheet metal, such that gauge designations for a thickness of ferrous steel may be different from the designation of galvanized steel and aluminum and non-ferrous metals. The height of spring 104 as measured along the axis 110 will be a height appropriate to the application and for a mattress spring core, may be between three and ten inches in length, and most commonly between four and eight inches.

As noted above, the sheet spring innercore depicted in FIGS. 1A-1C has a plurality of sheet springs that extend upwardly along their longitudinal axis which, as shown in these illustrations, is generally perpendicular to the base 102. In a typical embodiment, but not the only embodiment, the base 102 and the springs 104 are metal, and typically steel. However, any suitable materials or group of materials may be employed and the material selected will depend at least in part on the application being addressed. For example, metals, other than steel, may be used and different alloys, plastics, composite materials, polymers and other materials or combination of materials may be used.

As further depicted in FIG. 1A, the base 102 typically is formed from a first sheet of material, usually a first sheet of metal such as a sheet of thin steel. Again, however, the sheet of material may be plastic, composite materials or any other suitable material or group of materials. FIG. 1A also shows that each spring 104 is a band of material that is curved to allow the band to resiliently bend, compress and flex, thereby providing a spring force for supporting a load. In FIG. 1A each spring 104 is adjacent to a respective opening or cut out 106. The cutout 106 has a rectangular profile. In the depicted embodiment the spring 104 is formed from the flat band of material that is cutout of the sheet. As will be discussed in more detail hereinafter, the cutout band may be bent into the serpentine shape. As such the spring 104 is integrally attached to the plate 102 in that the attachment point 108 may be the part of the plate 102 that is not cut through when the rectangular profile is cut from the plate 102. However, in alternate embodiments the spring 104 may be a discrete spring that is welded, bolted or otherwise joined to the plate 102. In either case the plate provides a border support about the periphery of the innercore.

The size of the plate 102 will depend upon the application, and in certain embodiments will be substantially the size of a conventional mattress, such as a twin, queen or king mattress. Alternatively, the plate 102 may be sized to provide a portion of a mattress, such as a lumbar section, or an edge support. In such embodiments, the remainder of the innercore may be helical coils, encased coils, foam, latex, viscoelastic or any other suitable material.

The side-fixed flat spring 104 depicted in FIG. 2 compresses, in response to downward load, substantially along the axis 110. Transversally applied loads will cause some compression and movement in a direction transverse to the axis 110. However, the serpentine shape of spring 104 responds to downward force by expanding outwardly from its center so that outermost sections 112 travel further away from the spring center at attachment point 108. As such, the dynamic response of spring 104 has similarities to the dynamic response of a fixed coil spring. The rate of the flat spring depicted in FIG. 2, i.e. the measure of the stiffness of the spring expressed in terms of pounds per inch (lb/in) and representative of the pounds of force required to compress (or stretch) the spring by one inch may be set by the number of curves, the selection of the spring material, the use of any coatings, and the gauge, i.e. thickness, of the spring 104.

Figure 3:
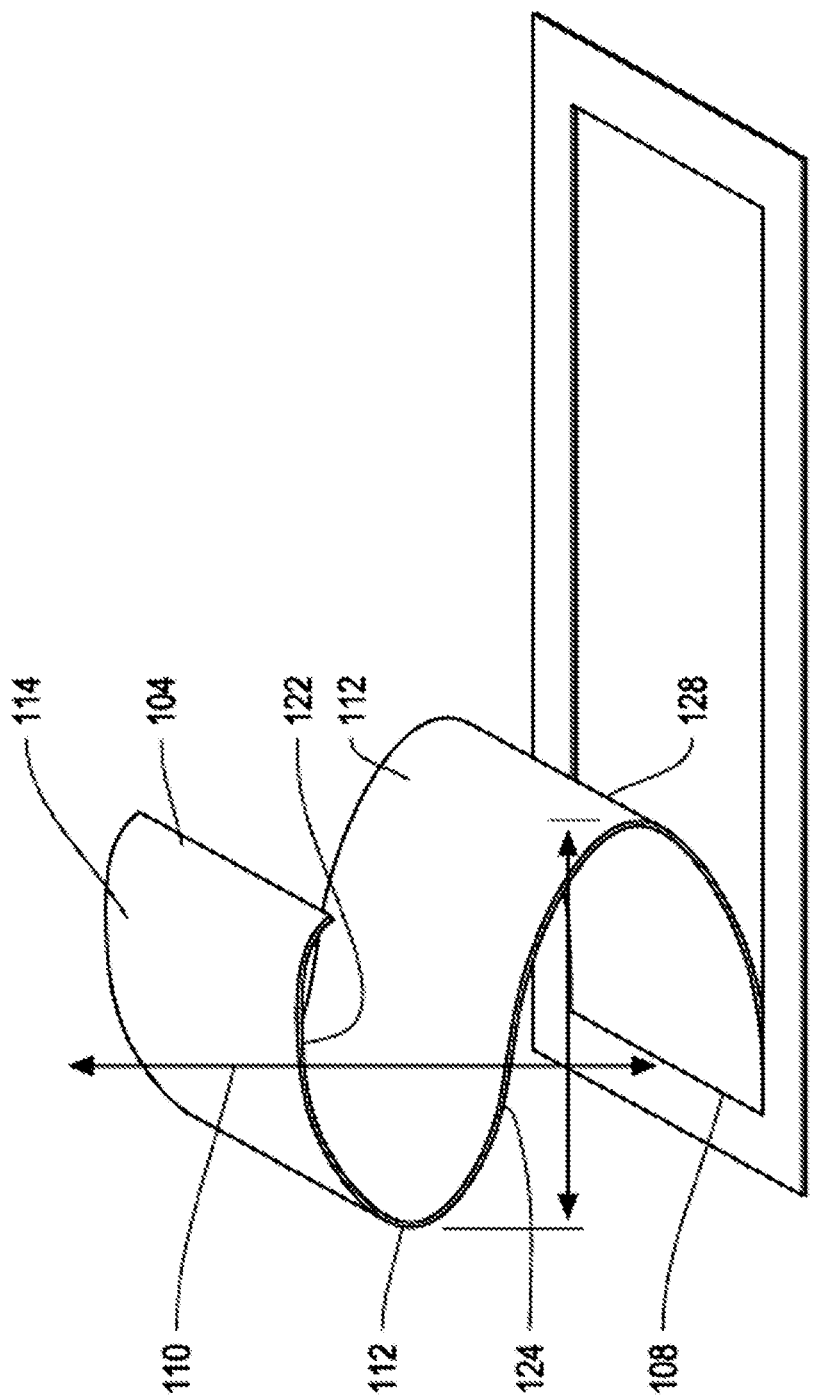
FIG. 3 depicts the side fixed flat spring integrally in a compressed state.

FIG. 3 depicts the spring 104 of FIG. 2 in a partially compressed condition. The apex 114 is compressed lower along axis 110 and the outermost sections 112 are moved farther from the center of spring 104. Not to be bound by theory, but it is understood that the spring dynamics include the response of the two curves of spring 104 to the applied force. FIG. 3 illustrates that the spring 104 has an upper arm 122 that is the upper arm in the top most curve of the spring 104 and has a mid arm 124 that is shared between the upper and lower curves and a lower arm 128 that is part of the lower curve and that is fixed at its end to the attachment point 108.

As can be seen by comparing FIG. 2 against FIG. 3, the downward applied force applied at apex 114 compresses the spring 104 along axis 110. The spring 104 response is understood to arise from the arms of the curves, for example, arm 122, acting like a lever arm acting on a fulcrum point at about outermost section 112, where the arm 122 is driving a load related to the torsional modulus of the spring material, as well as the thickness of the spring 104. A similar levering dynamic is illustrated in the lower curve of the spring 104.

FIG. 4A depicts an alternative embodiment of a flat spring where the depicted flat spring 404 has three curves. The number of curves employed will be based, at least in part, on the spring rate to be achieved. Other spring designs may be employed, including springs with additional curves, curves that are asymmetric of each other, curves that twist helically about the longitudinal axis and springs that have curved profiles, such as an hour-glass profile.

Figure 4B:
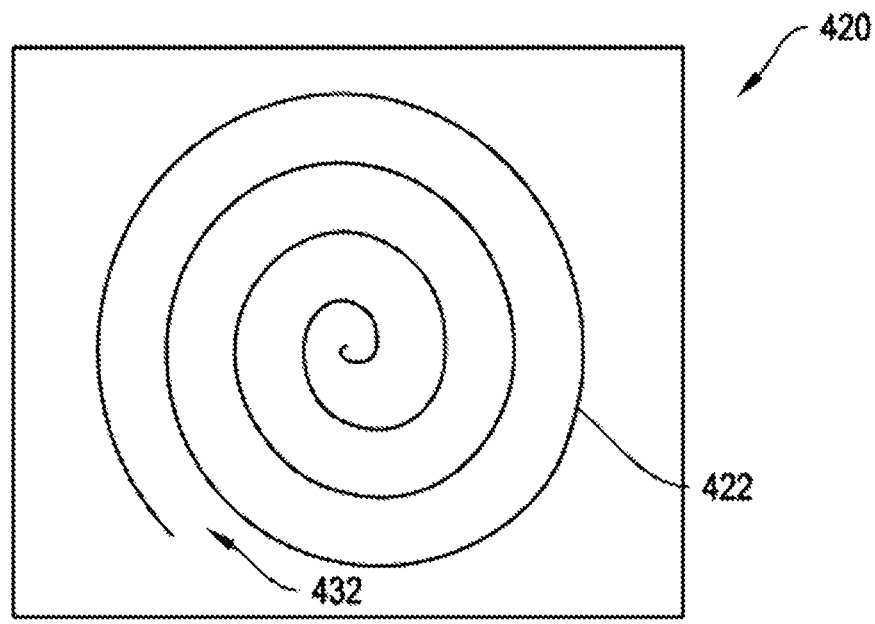
Figure 4C:
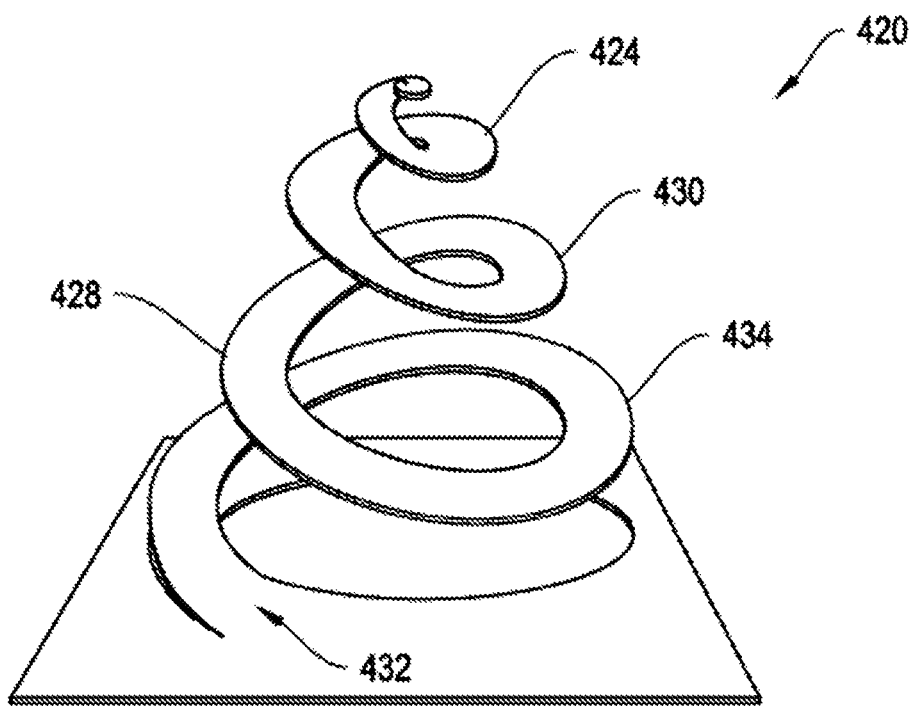

FIG. 4B and FIG. 4C depict respectively a bird's eye view and an isometric view of an alternative embodiment of a sheet spring suitable for use with the systems and process described herein. The depicted spring 420 is a helical asymmetric spring formed by cutting, punching or otherwise machining a spiral cut profile 422 into the sheet. The spiral cut 420 optionally through a progressive die process and may be pulled upward from the sheet to form the coil having a plurality of coils including the upper coil 424 and lower coil 430. The spring 420 has an attachment 432 that is integral with the sheet and a circular profile 434 forms an opening in the sheet and under the spring 420.

Returning to FIGS. 1B and 1C, it is illustrated that the profile of the side-fixed flat spring 104 allows for springs to be placed proximate to each other with pitches being comparable to the pitches employed in spring coil mattresses. In particular, FIG. 1B depicts a row of springs 104 having a pitch spacing 120 of about one-sixth the width of a spring 104. The width of the spring may vary depending upon the application and for mattresses or foundations will typically range from one to five inches. By selecting optional geometries for the spring, the spacing may be reduced and overlapping spring elements may be achieved. For example, returning to FIG. 1A, in optional embodiments, plate arm 116 that separates adjacent springs 104 may be eliminated or reduced so that the width of the springs 104 may be increased to thereby achieve closer spacing or even overlap of adjacent springs 104. FIG. 1C illustrates that the innercore flat spring assembly mimics well the physical layout of an open coil innercore in both coil count, coil pitch and coil height. Additionally, the springs 104 compress downward along the axis 110 in response to a downward load, similar to the compression action of an open coil.

Generally, the springs 104 are formed in an S-Shape. In certain embodiments, forming an S-shape may require the punched-out opening 106 to be somewhat lengthy. Therefore, the cutout 106 may be long and consequently, the springs 104 may be separated from each other by a longer distance than is desirable. In such embodiments, it may be desirable to stack two or more sheets 102 on top of each other to fill the cutout 106 and achieve the desired pitch between springs. In general, the number of sheets used to form the final sheet spring array may depend on the size, shape, and orientation of the springs, and may range from one sheet up to two, three, or even more sheets. In some embodiments, the number of sheet used to form the final sheet spring array may depend on the desired stiffness of the stacked springs. In some embodiments, the number of sheets used to form the final sheet spring array may depend on the desired density of the stacked springs.

In any case, the innercore may include multiple sheets of material, typically metal. Each sheet may have springs and the springs may be aligned so that springs of one sheet align with adjacent openings or another sheet. The sheets may be stacked so that the springs fit within the openings and optionally the sheets may be welded, bolted or otherwise joined. The spring shapes, sizes, spring constant, and types may vary from sheet to sheet so that the innercore has multiple types of springs as well as optionally plural areas of firmness.

Figure 5A:
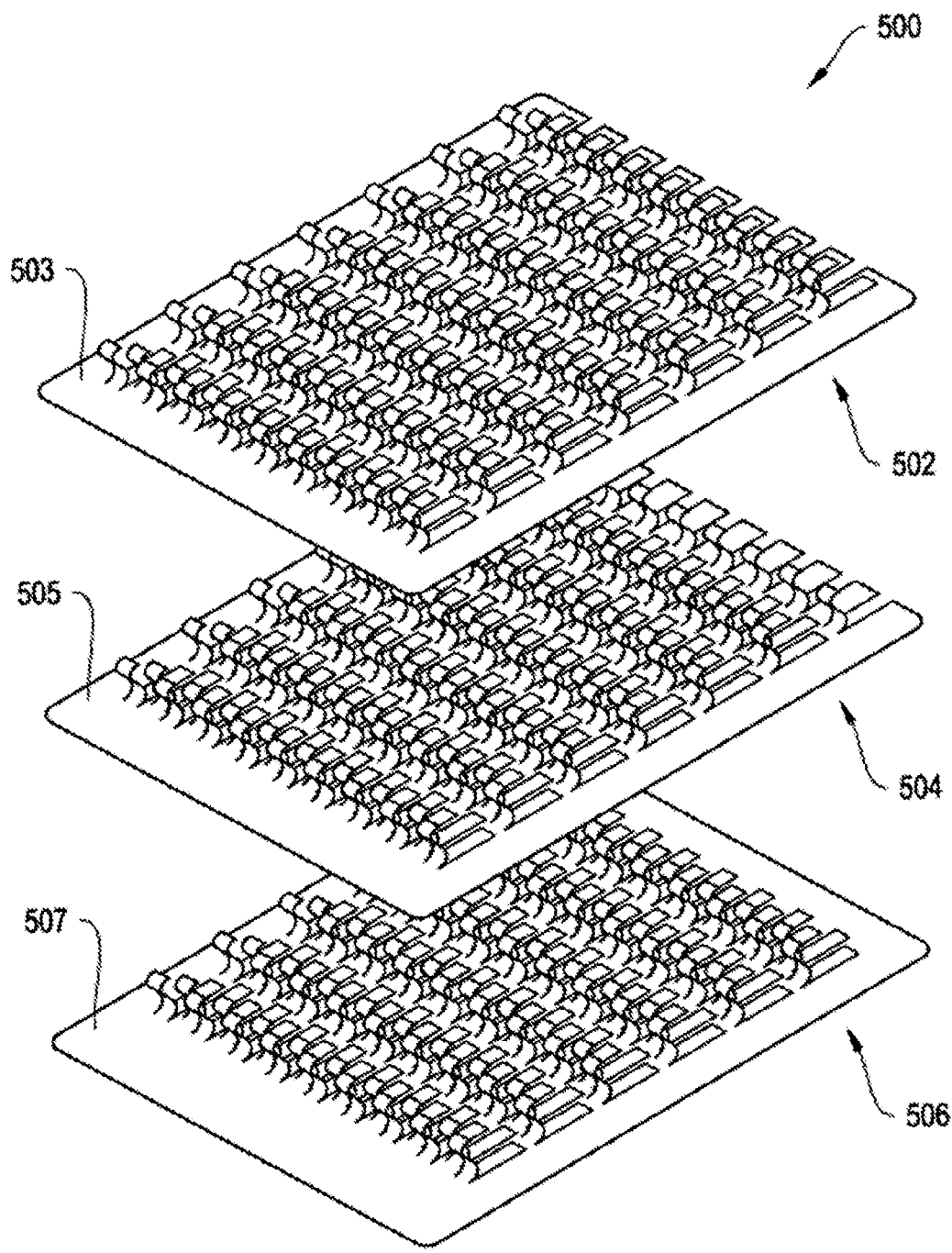
FIG. 5A depicts an exploded view of the sheet spring system according to one embodiment of the invention.
Figure 5B:
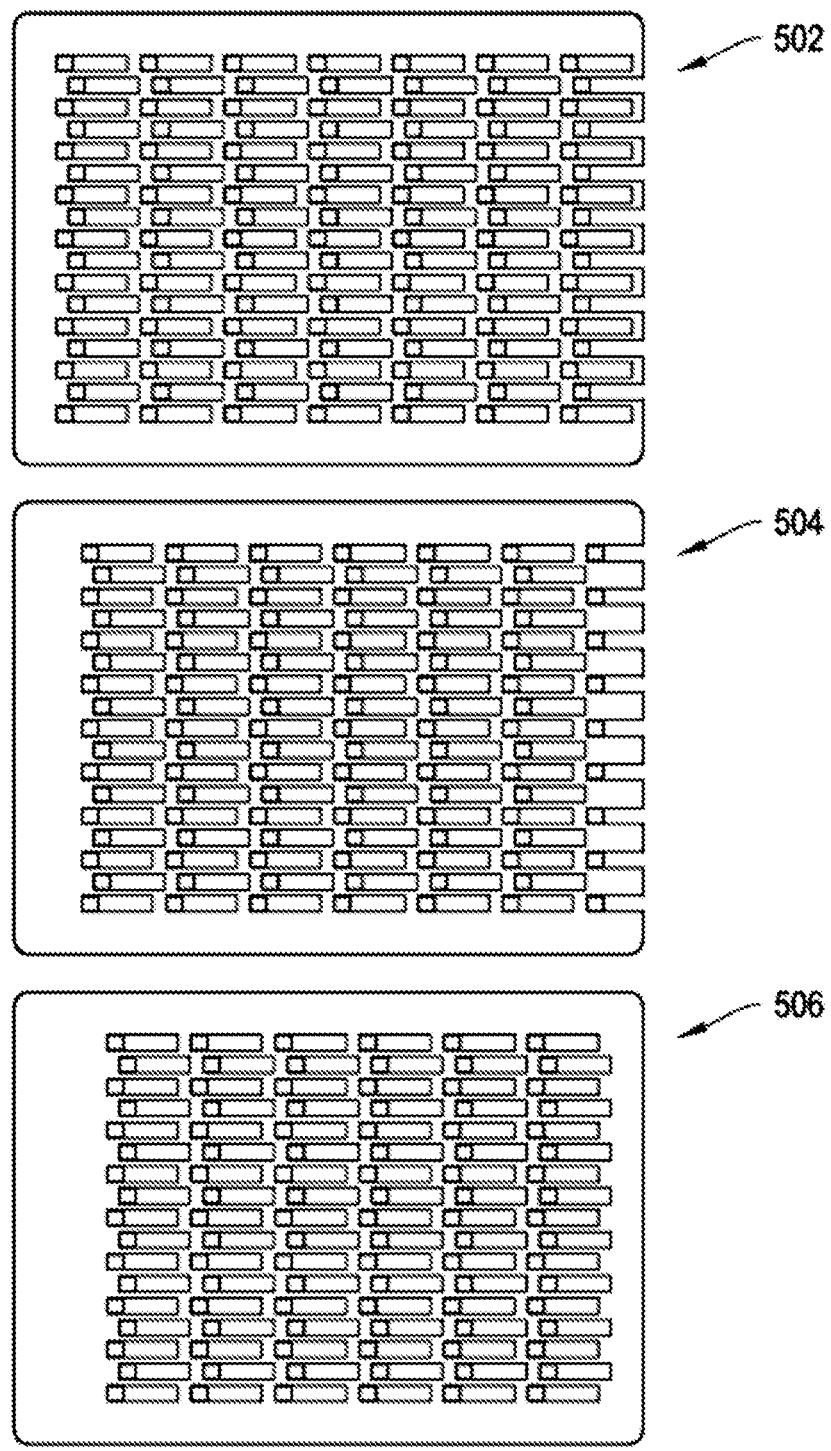
FIG. 5B depicts a top view of the three sheets of FIG. 3A.
Figure 6A:
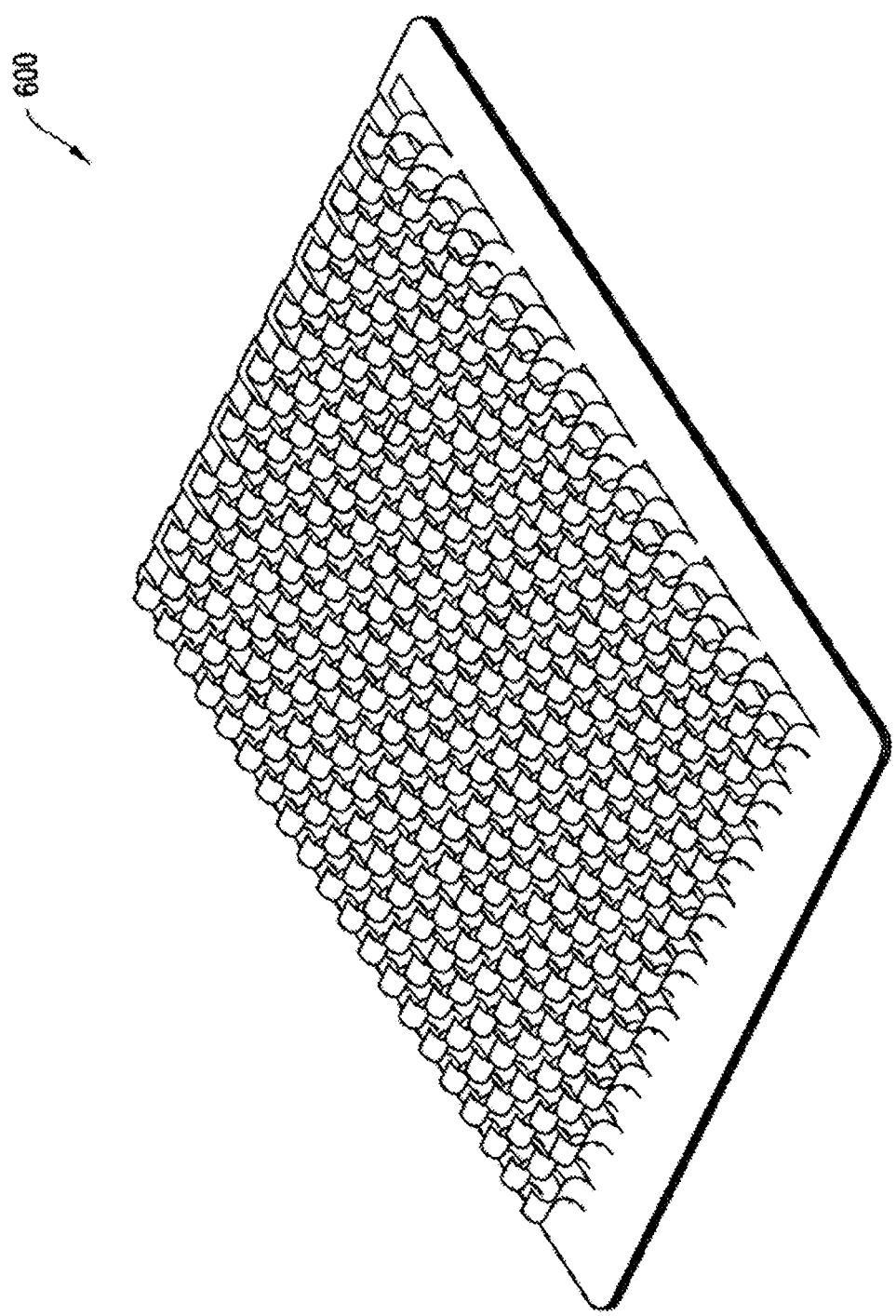
FIG. 6A depicts the sheet spring system according to the illustrative embodiment of the invention.
Figure 6B:
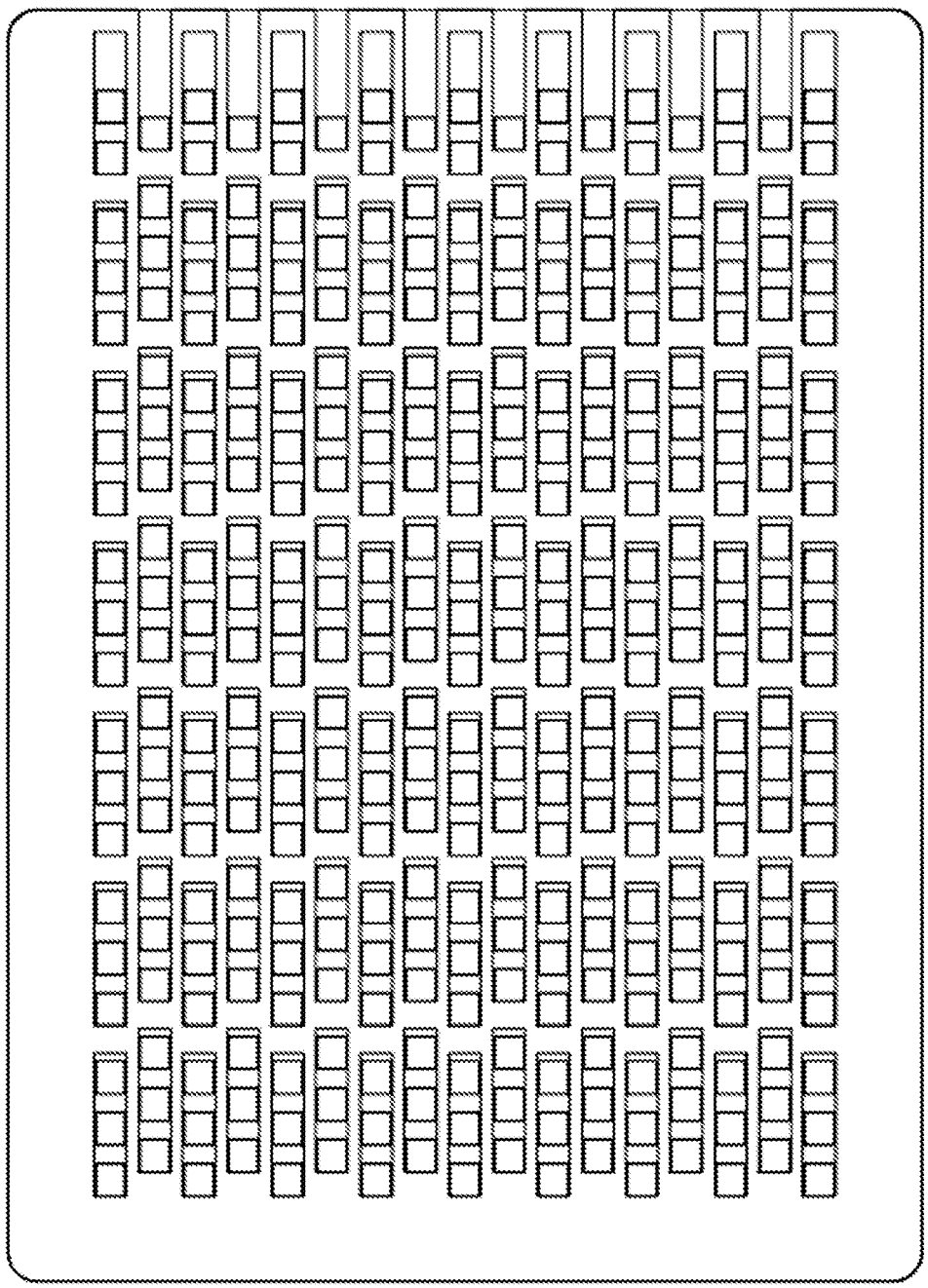
FIG. 6B depicts a top view of the sheet spring system of FIG. 4A.
Figure 9:
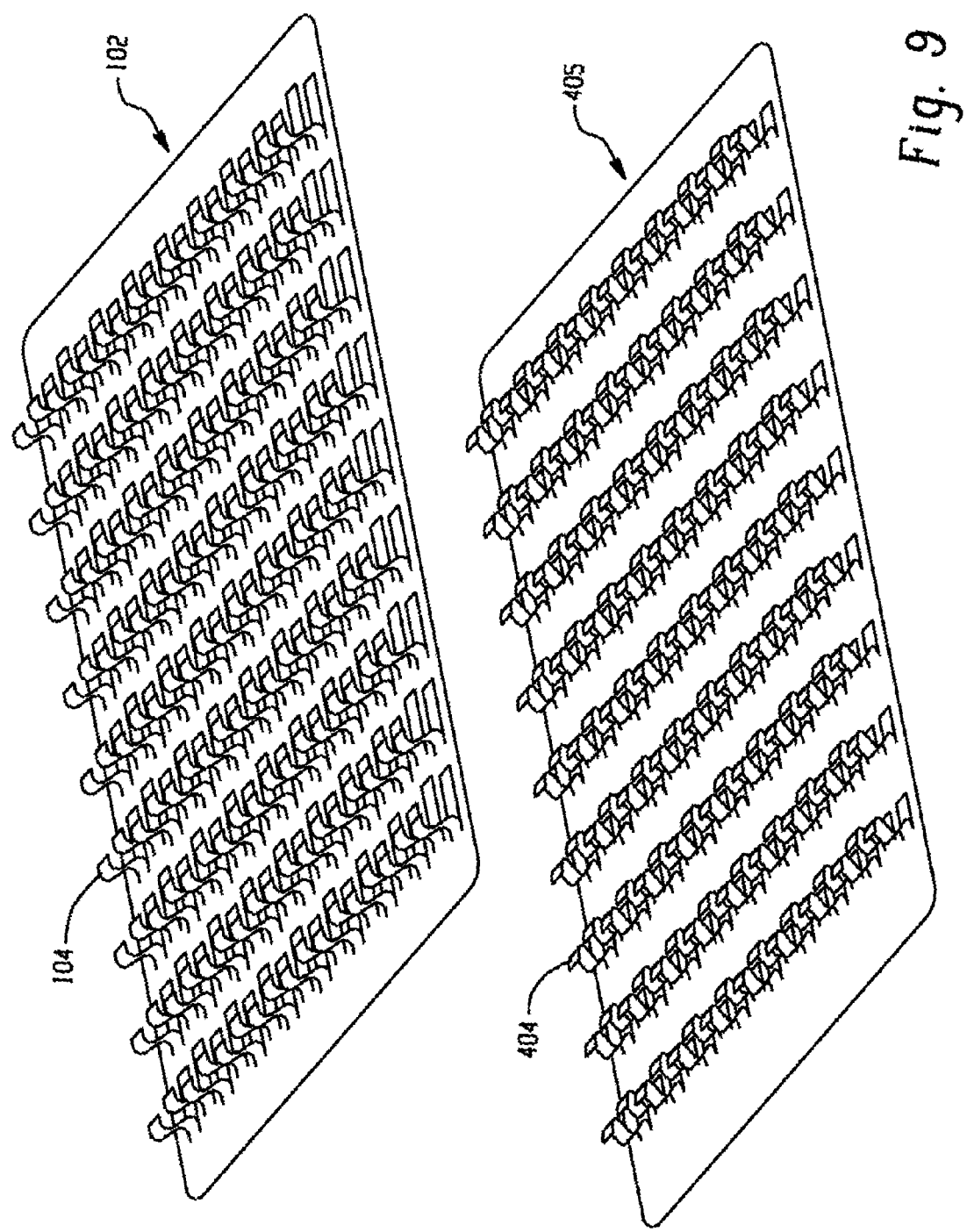
FIGS. 9 and 10 depict a sheet spring system in according to other embodiments.
Figure 10:
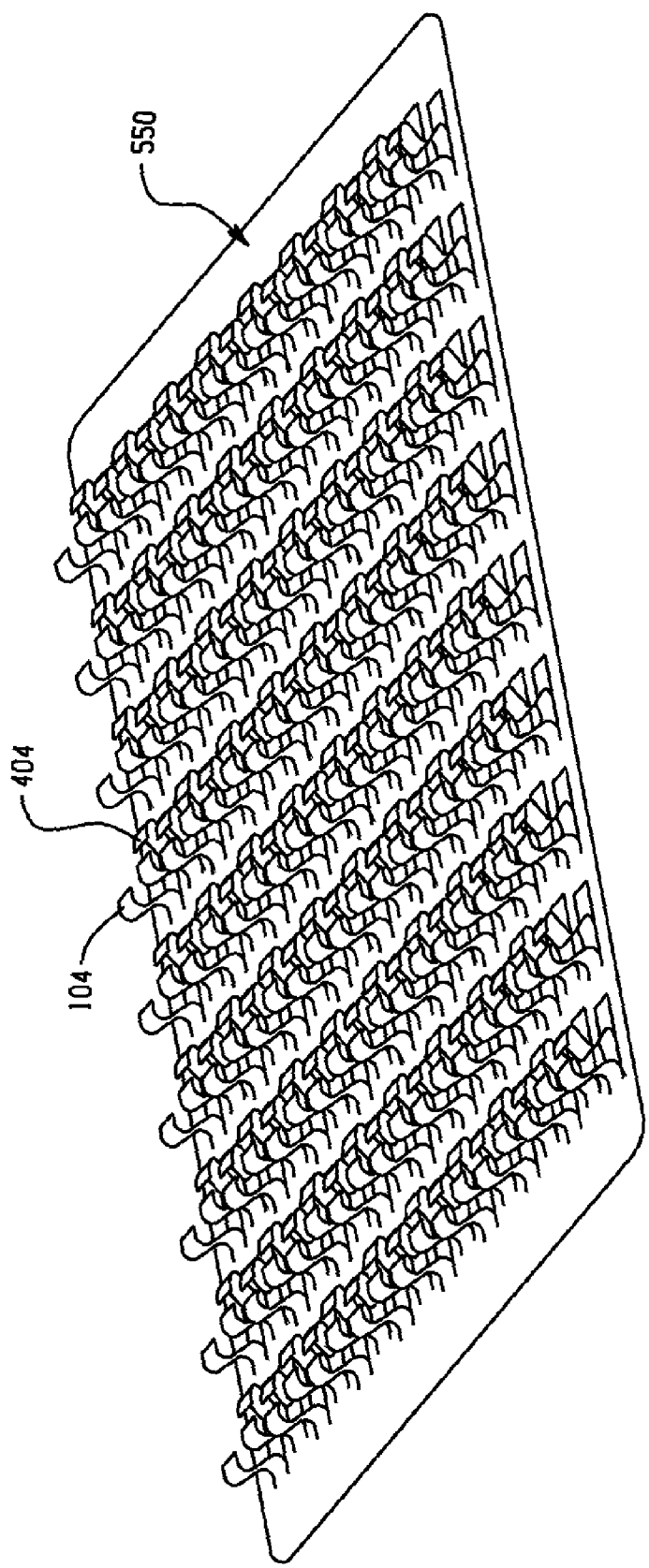

FIGS. 5A-6B depict such an array of flat springs having three metal sheet members 502, 504, and 506. The different shape and placement of springs 104 may provide different firmness and spring characteristics. Specifically, FIG. 5A depicts three sheet member spring arrays 502, 504, and 506. All three are depicted as aligned, with sheet 502 above 504 and 504 above sheet 506. At the end of each sheet 502, 504 and 506 is a panel of intact metal that is flat and contains no springs; these panels are 503, 505 and 507 respectively. The intact panels 503, 505 and 507 are of different widths, with panel 507 being the largest. Consequently, sheet member 506 has less springs per column, depicted here as six springs per column, than the other sheet members 504 and 502. By aligning the sheet members 502-506 and having the sheet panels have panels of intact metal that offset the first spring in the columns of that sheet member, the sheet members 502-506 are stackable so that one fits over the other, resulting in a combined assembly that has a higher spring count than the individual sheet members. Optionally, the stacked sheet members 502-506 may be welded, bolted or otherwise joined together. Further optionally, the individual sheet members may have springs of different shapes, so that the final assembly includes multiple spring types. For example, a serpentine shape with more bends than the S-shape may be used in one sheet member, and S-shaped springs in the others as is shown in FIGS. 9-10. In FIG. 9, each sheet 102, 405 has different shaped springs 104, 404, respectively. In FIG. 10, the sheet 550 has different shaped springs 104 and 404 thereon.

As noted above, the sheets may be formed from metal or any suitable rigid and resilient material, such as a molded plastic material. In some embodiments, sheets may include multiple materials. In certain embodiments, a sheet may be a multilayer sheet, with each sheet formed of a different material. For example, a sheet may include a sheet of titanium, a sheet of steel, and a sheet of aluminum. Different materials may provide different spring characteristics to the springs. A sheet may also have different regions formed of different materials, to allow for varying spring characteristics across the sheet member based on materials instead of or in addition to sheet spring shape variations.

Figure 7:
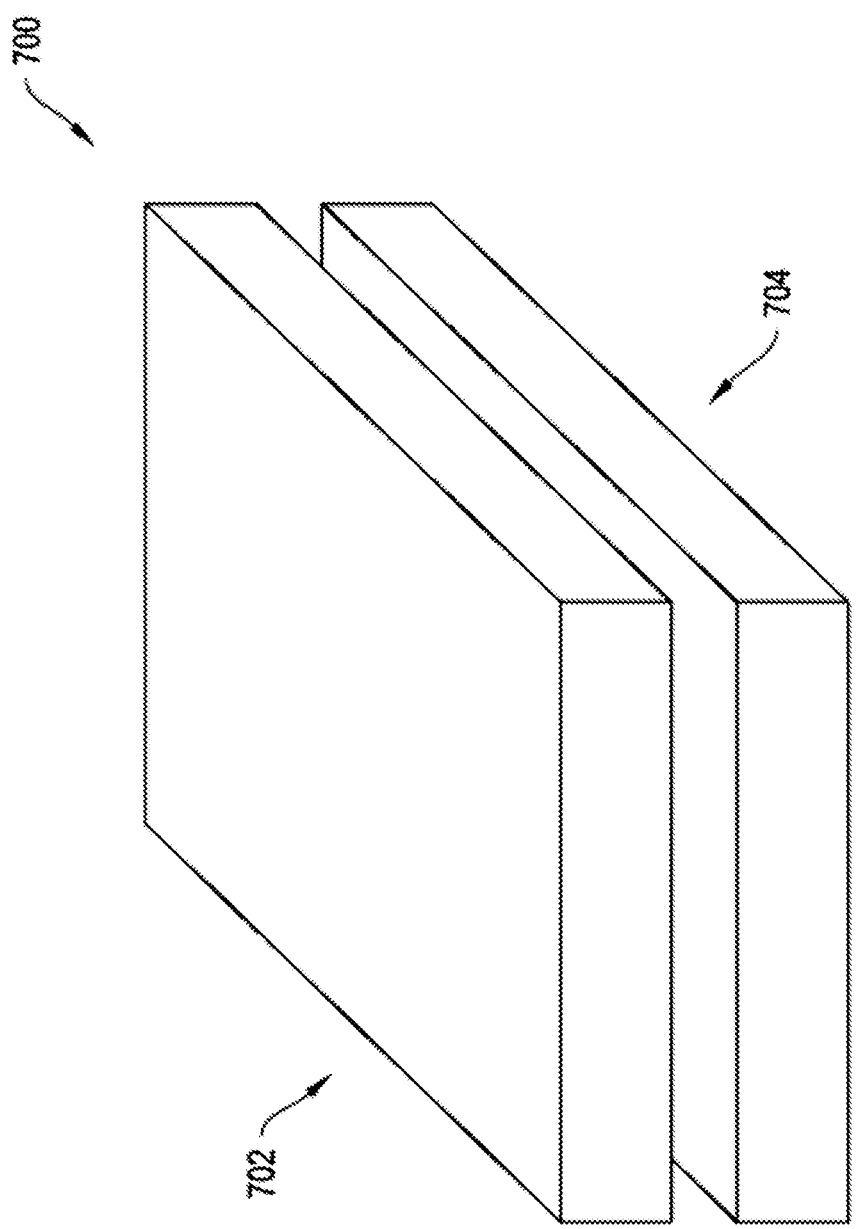
FIG. 7 depicts a mattress assembly, according to one illustrative embodiment of the invention.

The spring array according to the systems and methods described herein may be used as an innercore of a mattress assembly. FIG. 7 depicts an illustrative embodiment of a mattress assembly 700. Mattress assembly 700 may include a mattress 702 and a foundation 704. Mattress 702 includes an innercore (not shown) that may include a spring array similar to spring array 100 depicted in FIG. 1A. The use of spring arrays from sheet members may be simpler, easier to manufacture, and more cost-effective than coil springs. In one embodiment, the innercore may include one or more sheets of metal, from which individual metal springs are partially punched out and formed. The innercore may also include an innercore cover that at least partially covers the metal springs. Typically, the cover is foam, fabric or a combination of both. In any case, the mattress 702 and foundation 704 can use conventional padding and upholstery, and this padding, coverings and upholstery may fit over and around the innercore as with a conventional open coil mattress. In some embodiments, the metal springs may be fastened to the innercore cover, via adhesives and/or mechanical fasteners. In certain embodiments, the innercore may also include other support structures and materials, such as spring coils, encased spring coils, foam, latex, gel, viscoelastic gel, or a combination of the foregoing. The innercore may have firmness that varies across its length and width. Foundation 704 may include a mattress frame or mattress corner guards. This innercore may also be a foundation grid made sufficiently rigid to provide foundation support for a mattress.

In certain embodiments, mattress 702 may also include one or more side rails (not shown). Side rails may be attached or placed adjacent to one or more sides of the innercore, and may include metal springs, spring coils, encased spring coils, foam, latex, gel, viscoelastic gel, or a combination, in one or more layers. Side rails may be placed on opposing sides of the innercore, on all four sides of the innercore, or only on one side of the innercore. In some mattress embodiments, the innercore may not include metal springs, and the side rails may include metal springs. In certain embodiments, the side rails may comprise edge supports with firmness greater than the innercore. The side rails may be fastened to the innercore via adhesives or mechanical fasteners.

In some embodiments, mattress 702 may include a padding layer. The padding layer may be adjacent to the top surface of the innercore or the bottom surface of the innercore. In some embodiments, mattress 702 may be a reversible mattress, in which the top surface and bottom surface in one configuration may be the bottom surface and top surface, respectively, in another configuration. In other embodiments, there may be a padding layer adjacent to the top surface and another padding layer adjacent to the bottom surface of the innercore. The padding layer may include foam, gel, or any other type of padding material. In some embodiments, mattress 702 may include a topper pad that may define the top exterior surface of the mattress. This topper pad may include foam, gel, or any other type of padding material. In certain embodiments, the topper pad and/or the padding layer may be made of a quiltable material. The topper pad may have a uniform height or thickness along its width and length, or its height or thickness may vary along at least one of the width and length. For example, the topper pad may be thicker in the center than at its periphery.

In certain embodiments, mattress 702 may include one or more fire-retardant, liquid-resistant, or allergy-resistant layers. One or more of these layers may be placed adjacent to the innercore on its top surface, bottom surface, and/or one or more side surfaces. In some embodiments, one or more of these layers may be placed adjacent to a surface of a padding layer or a topper pad in the mattress 702. The one or more fire-retardant layers may comprise a fire barrier fabric or laminate that complies with regulatory requirements for flammability, such as the Federal Standard 16 CFR 1632 and 1633 or the California Bureau of Home Furnishings Technical Bulletin 129 Flammability Test Procedure, the entirety of which are hereby incorporated by reference. In certain embodiments, a fire-retardant layer may be quiltable. The one or more liquid-resistant or allergy-resistant layers may comprise a coated or uncoated fabric or laminate material. The liquid-resistant or allergy-resistant layer may be breathable and quiltable.

The various layers detailed above may be fastened to each other in a number of ways. For example, layers may be attached to each other along the edges, in the center, between the edges and the center, or some combination of the above. Attachment may be done via stitching, quilting, adhesives, or fastening via mechanical fasteners.

Figure 8:
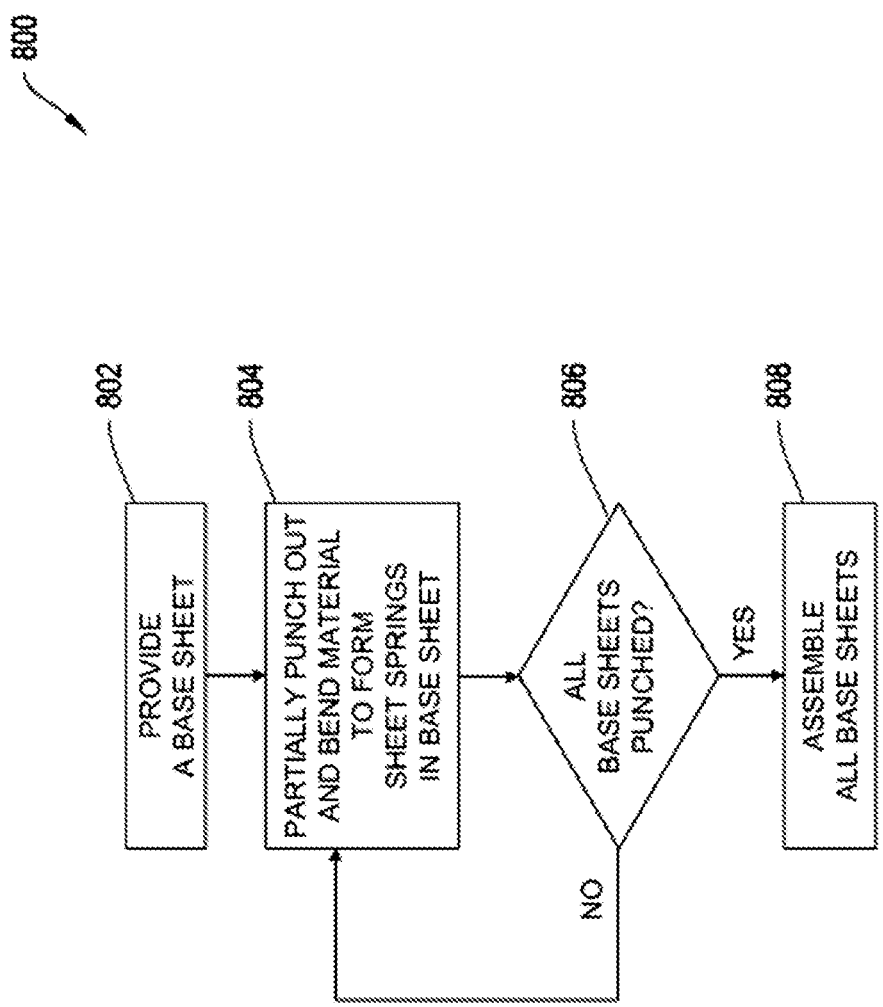
FIG. 8 is a flowchart depicting an illustrative process for manufacturing a mattress innercore with metal springs.

FIG. 8 depicts an illustrative process 800 for manufacturing a mattress innercore with metal spring arrays. First, in step 802, a sheet member is provided. Typically, the metal sheet is fed into an automated die, often a progressive die that can take in feedstock sheets and punch and bend the stock. Springs are then formed from the partially punched-out sections in the sheet member in step 804. In this method, the springs are integrally formed into the assembly and welding or other joining process is avoided. Further, the mechanical connection between the plate and the spring arises from the spring being a ribbon of plate and therefore continuously joined to the plate, making for a robust connection with the plate. Alternatively, a sheet member may be molded or otherwise formed of another material such as plastic. At step 806, if multiple sheet members are to be used for the innercore and more sheet members with formed springs are needed, the process reverts to step 802. If all of the sheet members to be incorporated into the innercore have been processed to form springs, then in step 808, the sheet members are assembled to form the final sheet spring array. In certain embodiments, alternate processing steps may be inserted into the process. For example, if the sheet members or springs are to be coated with protective material, the coating process may occur after step 804 and before step 806, or possibly before final assembly of the sheet members at step 808.

Variations, modifications, and other implementations of what is described may be employed without departing from the scope of the invention. More specifically, any of the method and system features described above or incorporated by reference may be combined with any other suitable method or system features disclosed herein or incorporated by reference, and is within the scope of the contemplated inventions. The systems and methods may be embodied in other specific forms without departing from the invention or essential characteristics thereof. The foregoing embodiments are therefore to be considered in all respects illustrative, rather than limiting of the invention. The teachings of all references cited herein are hereby incorporated by reference in their entirety.

What is claimed is:

1. A furniture spring assembly comprising:
   a first spring array comprising:
   a first base;
   a first matrix of flat spring elements extending upward along a longitudinal axis substantially perpendicular from the first base to a free terminal end, wherein the spring elements are compressible along the longitudinal axis in response to a force applied along the longitudinal axis; and
   a plurality of openings in the first base, each opening defined by a first end and a second end spaced apart from the first end, wherein the first matrix of flat spring elements are all immediately adjacent and integral to the first end of the plurality of openings, wherein each one of the flat spring elements is formed from a removed material corresponding to the selected one of the plurality of openings.

2. The furniture spring assembly of claim 1, wherein the first base and the first matrix of flat spring elements are formed of a polymer.

3. The furniture spring assembly of claim 1, wherein the first base and the first matrix of flat spring elements are formed of a metal.

4. The furniture spring assembly of claim 1, wherein the flat spring elements are serpentine shaped.

5. The furniture spring assembly according to claim 1, further comprising:
   at least one additional spring array stacked onto the first spring array, the at least one additional spring array comprising a base; a matrix of flat spring elements extending upward along a longitudinal axis substantially perpendicular from the at least one additional spring array base to a free terminal end, wherein the at least one additional spring array spring elements are compressible along the longitudinal axis in response to a force applied along the longitudinal axis; and a plurality of openings in the base, each opening defined by a first end and a second end spaced apart from the first end, wherein each one of the flat spring elements is immediately adjacent to the first end of the plurality of openings in the at least one additional spring array, wherein each one of the flat spring elements in the at least one additional spring array are formed from a removed material corresponding to the selected one of the plurality of openings, wherein the first and the at least one additional spring arrays are aligned such that the first base and the at least one additional base abut one another and the at least one additional matrix of flat spring elements are offset relative to the first matrix of flat spring elements and are in alignment with the respective adjacent openings in the first base.

6. The furniture spring assembly of claim 5, wherein the first or second spring array comprise one or more different materials.

7. The furniture spring assembly of claim 5, wherein the first flat spring elements and the flat spring elements in the at least one additional spring array are of similar height.

8. The furniture spring assembly of claim 1, further comprising an innercore cover that at least partially covers a top surface of the first spring array.

9. The furniture spring assembly of claim 1, wherein one or more side rails are disposed adjacent to the first spring array.

10. The furniture spring assembly of claim 1, wherein a padding layer is disposed on at least one surface of the first spring array.

11. The furniture spring assembly of claim 1, wherein a topper pad is disposed on at least one surface of the of the first spring array, the topper pad having a variable height or thickness varying along at least one of width and length of the topper pad.

12. The furniture spring assembly of claim 1, wherein one or more fire-retardant, liquid-resistant, or allergy resistant layers are disposed on at least one surface of the of the first spring array.

13. A furniture spring assembly comprising:
   a first spring array comprising a first base; a first matrix of flat spring elements extending upward along a longitudinal axis substantially perpendicular from the first base to a free terminal end, wherein the spring elements are compressible along the longitudinal axis in response to a force applied along the longitudinal axis; and a plurality of openings in the first base, each opening defined by a first end and a second end spaced apart from the first end, wherein the first matrix of flat spring elements are all immediately adjacent and integral to the first end of the plurality of openings, wherein each one of the flat spring elements is formed from a removed material corresponding to the selected one of the plurality of openings; and
   at least one additional spring array stacked onto the first spring array, the at least one additional spring array comprising a base; a matrix of flat spring elements extending upward along a longitudinal axis substantially perpendicular from the at least one additional spring array base to a free terminal end, wherein the at least one additional spring array spring elements are compressible along the longitudinal axis in response to a force applied along the longitudinal axis; and a plurality of openings in the base, each opening defined by a first end and a second end spaced apart from the first end, wherein each one of the flat spring elements is immediately adjacent to the first end of the plurality of openings in the at least one additional spring array, wherein each one of the flat spring elements in the at least one additional spring array are formed from a removed material corresponding to the selected one of the plurality of openings, wherein the first and the at least one additional spring arrays are aligned such that the first base and the at least one additional base abut one another and the at least one additional matrix of flat spring elements are offset relative to the first matrix of flat spring elements and are in alignment with the respective adjacent openings in the first base.

\* \* \* \* \*